Patented Jan. 20, 1925.

1,523,840

UNITED STATES PATENT OFFICE.

MORITZ SCHLESINGER, OF NEW YORK, N. Y.

TOOTH PASTE.

No Drawing. Application filed January 16, 1924. Serial No. 686,637.

*To all whom it may concern:*

Be it known that I, MORITZ SCHLESINGER, a citizen of the United States, residing at 60 West 68th Street, New York city, in the county of New York, State of New York, have invented certain new and useful Improvements in Tooth Paste; and I do hereby declare the following to be a full, clear, and exact description of the invention, such as will enable others skilled in the art to which it appertains to make and use the same.

This invention relates to tooth paste and has for its objects the provision of a paste which always remains soft and plastic in the tube, which not only cleans and polishes the teeth, but absorbs impurities, massages the gums, stimulating the soft tissues and increasing the blood supply; and finally, has a pleasing and appropriate flavor.

The characteristic ingredients of the paste of the present invention are finely pulverized charcoal and mineral oil. The charcoal performs two functions; first it acts as a polishing agent, and second, it absorbs impurities, such as particles of decomposed food, and thus acts very effectively as a purifying agent. The mineral oil (preferably a pure white tasteless oil) keeps the paste soft indefinitely and prevents the very objectionable hardening so common in tooth paste. But more important than this, the oil acts as a lubricant for mechanical or physical massage and increases the blood supply by stimulating the soft gum tissues. Furthermore, it acts as a vehicle, producing a very smooth, unctuous paste, which does not scratch the teeth.

The use of charcoal results in a black paste. As appropriate flavoring agents for such a paste, I employ oil of anise and oil of coriander either separately or in combination, these oils imparting a taste of licorice to the paste. They also act as antiseptics.

Among other ingredients of my paste may be precipitated chalk, powdered orris root, bicarbonate of soda, glycerine, menthol and a relatively small proportion of powdered soap, or their equivalents, the functions of which are well understood. By using a small proportion of soap, the excessive foaming which so often attends the use of tooth paste is avoided.

I have found that the following formula gives a satisfactory paste and is given as the present preferred embodiment of my invention:—powdered soap, (castile), 48 grs.; precipitated chalk, 3 dms., 12 grs.; powdered orris root, 1 dm., 36 grs.; bicarbonate of soda, 48 grs.; glycerine, 4 fluid dms., 48 mms.; menthol, 8 grs.; oil of anise, 26 drops; oil of coriander, 5 drops; mineral oil, (petrolatum album), 2 fluid dms., 48 mms.; charcoal, (pulv. animal charcoal), 42 grs.

I am aware that charcoal has been used before in tooth powders, but when used dry, charcoal would be very likely to scratch the enamel of the teeth. When used in a paste in combination with mineral oil, the danger from the source is obviated without impairing the useful functions of the charcoal. In compounding the paste, I thoroughly triturate the charcoal and oil in a mortar. I am also aware that mineral oil emulsions have been used in tooth pastes but the oil has been used in such small quantities as to be ineffectual as a massage lubricant or gum stimulant. Furthermore, emulsions are not permanent; the water evaporates and the small quantity of residual oil is insufficient to prevent hardening of the paste. I have found that for most satisfactory results, the proportion of mineral oil in the paste should be not less than about 15% and not more than about 25%.

Except for the trituration of the charcoal and oil, the ingredients of my paste are compounded in the usual way and result in a soft paste of proper consistency.

I claim:

1. A tooth paste containing mineral oil and charcoal as characteristic ingredients, the charcoal being triturated in the presence of the oil.

2. A tooth paste containing mineral oil and charcoal as characteristic ingredients.

3. A tooth paste containing mineral oil and charcoal as characteristic ingredients and having the flavor of licorice.

4. A tooth paste containing mineral oil and charcoal as characteristic ingredients and oil of anise.

5. A tooth paste containing mineral oil and charcoal as characteristic ingredients, oil of anise, and oil of coriander.

In testimony whereof I affix my signature.

MORITZ SCHLESINGER.